US012129574B2

(12) United States Patent
Keh et al.

(10) Patent No.: US 12,129,574 B2
(45) Date of Patent: Oct. 29, 2024

(54) REGENERATED CELLULOSE COMPOSITE FIBER AND METHOD OF PREPARATION THEREOF

(71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Alex Chan, Hong Kong (CN); Un Teng Lam, Hong Kong (CN); Yiu Sing Wong, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 492 days.

(21) Appl. No.: 17/449,465

(22) Filed: Sep. 30, 2021

(65) Prior Publication Data

US 2023/0096738 A1 Mar. 30, 2023

(51) Int. Cl.
*D01F 2/02* (2006.01)
*D01F 1/10* (2006.01)
*B82Y 40/00* (2011.01)

(52) U.S. Cl.
CPC ............... *D01F 2/02* (2013.01); *D01F 1/10* (2013.01); *B82Y 40/00* (2013.01); *D10B 2201/22* (2013.01)

(58) Field of Classification Search
CPC .. D01F 1/10; D01F 2/02; B82Y 40/00; D10B 2201/22
See application file for complete search history.

(56) References Cited

U.S. PATENT DOCUMENTS

| 7,981,337 | B2 | 7/2011 | Zhang et al. |
| 8,962,821 | B2 | 2/2015 | Zhang et al. |
| 2020/0299416 | A1* | 9/2020 | Stigsson .................. D01F 1/10 |

FOREIGN PATENT DOCUMENTS

| CN | 104264258 A | 1/2015 |
| CN | 103147144 B | 3/2015 |
| CN | 105113034 A | 12/2015 |
| CN | 1285776 C | 11/2016 |
| CN | 108816164 A | 11/2018 |
| CN | 110373734 A | 10/2019 |
| CN | 110791828 A | 2/2020 |
| EP | 2889399 A1 | 7/2015 |
| EP | 2116557 B1 * | 12/2016 |
| WO | 2018/169479 A1 | 9/2018 |

OTHER PUBLICATIONS

CN104264258A from Google Patents (Year: 2024).*
CN105113034A from Google Patents (Year: 2024).*
International Search Report and Written Opinion of PCT application No. PCT/CN2021/122106 issued from the International Search Authority on Jul. 5, 2022.

* cited by examiner

*Primary Examiner* — Emmanuel S Luk
(74) *Attorney, Agent, or Firm* — S&F/WEHRW

(57) ABSTRACT

The present disclosure relates to methods for producing functional regenerated cellulose composite fibers and products thereof. The methods can be conducted with the use of recycled and/or virgin cellulose powder.

14 Claims, 8 Drawing Sheets

REGENERATED CELLULOSE COMPOSITE FIBER AND METHOD OF PREPARATION THEREOF

TECHNICAL FIELD

The present disclosure relates to a method of preparing a regenerated cellulose composite fiber from cellulose powder, which can be prepared using recycled post-consumer textile waste and/or virgin cellulose material, and products thereof.

BACKGROUND

Over the past few decades, textiles have been the fastest growing waste stream in many countries. The quantity of waste and its potential negative impacts on the environment are matters of concern to governments, the textile industry, and the community. Textile recycling has been challenging due to the fact that majority of textile products are blended materials. Separation of these blends into its constituent material is so far a big challenge and typically requires harsh and pollutant separation methods. PCT Patent Application No. PCT/CN2019/107499 provides an effective method for separating polyester and cotton from post-consumer fabric blends and generates polyester fiber and cellulose powder as by-products. Recovered polyester fibers have molecular weights that can be used as raw material for melt spinning to regenerate polyester fiber. On the other hand, the recovered cellulose powder cannot be used on its own as a raw material to prepare regenerated cellulose fiber by existing commercial processes due to its low degree of polymerization (DP). In light of this, a new approach of preparing regenerated cellulose fiber with tenacity comparable to commercial products using recovered cellulose powder is required to ensure the realization of a true closed loop recycling process.

CN 1285776, U.S. Pat. Nos. 7,981,337 and 8,962,821 describe methods for preparing regenerated cellulose fiber by direct dissolution in NaOH/urea or thiourea based solvent systems followed by fiber coagulation in 5-20% sulfuric acid solution. CN103147144B describes a method using a NaOH/urea solvent system and a polymeric material such as polyethylene glycol. EP2889399A1 and WO 2018/169479 describe methods of preparing cellulose fibers reinforced by nanomaterials. EP2889399A1 provides a method for spinning a cellulose fiber reinforced by cellulose nanoparticle, but expensive solvents such as ionic liquids and N-methylmorpholine N-oxide (NMMO) are used as solvents. WO 2018/169479 includes the addition of up to 10% of synthetic polymeric additive such as polypropylene to the cellulose solution, which is not desirable in natural products. Also, composite cellulose fibers produced by these methods do not possess IR emission and UV blocking functions. Known methods for preparing functional regenerated cellulose fiber with far IR function such as CN 110791828, CN 108816164, and CN 110373734 describe method additives such as biochar and graphene particles to impart far IR emitting function to the regenerated cellulose fibers. These methods rely on a modified viscose process, which involves the use of toxic sulfur-containing chemicals.

SUMMARY

The present disclosure provides a process for preparing regenerated cellulose composite fibers, which minimizes the use of petroleum-based chemicals as well as reduces or eliminates at least some of the drawbacks of existing commercial wet spinning processes, such as the viscose process and the lyocell process.

Drawbacks of the viscose process include the multiple processing steps and the use of highly polluting chemicals such as carbon disulfide, whereas the lycoell process suffers from high spinning temperature and expensive solvent. The method described herein can provide a direct dissolution approach in aqueous sodium hydroxide (NaOH). Another important aspect of the present disclosure is the inclusion of cellulose nanoparticles and other inorganic nanoparticles in the regenerated cellulose composite fibers to enhance fiber tenacity and impart add-value properties such as far infrared (FIR) emission and ultraviolet (UV) blocking functions.

To address at least some of the shortcomings in the art, in a first aspect, provided herein is a method of preparing a regenerated cellulose composite fiber, the method comprising: providing a cellulose solution comprising a metal hydroxide, urea, zinc oxide, cellulose having an average degree of polymerization (DP) of 300-800, and water; filtering the cellulose solution through at least one filter thereby forming a filtered cellulose solution; combining the filtered cellulose solution with a dispersion comprising cellulose nanoparticles and water thereby forming a crude cellulose dope; filtering the crude cellulose dope through at least one filter thereby forming a filtered cellulose dope; degassing the filtered cellulose dope thereby forming a cellulose dope; and extruding the cellulose dope in a coagulation bath thereby forming the regenerated cellulose composite fiber.

In certain embodiments, the method further comprises combining cellulose with an aqueous solution comprising metal hydroxide, urea, zinc oxide and water, thereby forming a cellulose solution precursor; adjusting the temperature of the cellulose solution precursor to between −20° C. to 0° C.; and adjusting the temperature of the cellulose solution precursor to 0° C. to 22° C. resulting in dissolution of substantially all of the cellulose and forming the cellulose solution In certain embodiments, the step of filtering the cellulose solution comprises filtering the cellulose solution with at least one filter having a pore size of at least 5 μm.

In certain embodiments, the cellulose nanoparticles have an average diameter of 100-500 nm.

In certain embodiments, the cellulose comprises virgin or recycled cellulose having a DP of 400-800 and cellulose powder having a DP of 100-150.

In certain embodiments, the cellulose powder is produced by hydrothermal treatment of a cellulose powder precursor selected from the group consisting of textile waste, a virgin textile, raw cellulose material, and mixtures thereof.

In certain embodiments, the hydrothermal treatment comprises heating the cellulose powder precursor at a temperature between 110-150° C. under autogenic pressure in the presence of an acid.

In certain embodiments, the cellulose has an average DP of 400-500.

In certain embodiments, the metal hydroxide is an alkaline earth metal hydroxide, an alkali metal hydroxide, or a mixture thereof.

In certain embodiments, the metal hydroxide is sodium hydroxide.

In certain embodiments, the concentration of the metal hydroxide, the urea, and the zinc oxide is 5-10% w/w, 7-15% w/w, and 0.1-1.0% w/w in the cellulose solution, respectively.

In certain embodiments, the concentration of the metal hydroxide, the urea, and the zinc oxide is 6-8% w/w, 12-14% w/w, and 0.1-0.2% w/w in the cellulose solution, respectively.

In certain embodiments, the dispersion comprises the cellulose nanoparticles at a concentration of 5-15% w/w.

In certain embodiments, the dispersion has a pH of 11-13.

In certain embodiments, the method further comprises providing cellulose powder having an average particle size between 50 to 100 µm and reducing the average particle size of the cellulose powder by acid hydrolysis or mechanical grinding thereby forming the cellulose nanoparticles, wherein the cellulose nanoparticles have an average diameter of 100-500 nm.

In certain embodiments, the cellulose solution further comprises at least one additive selected from the group consisting of far infrared (FIR) emissive nanoparticles and ultraviolet (UV) blocking nanoparticles.

In certain embodiments, the FIR emissive nanoparticles are selected from titanium oxide, zirconium dioxide, aluminum oxide, magnesium oxide, silicon dioxide, and mixtures thereof.

In certain embodiments, the method comprises: combining cellulose having an average DP of 400-500, wherein the cellulose comprises virgin or recycled cellulose having a DP of 450-550 and cellulose powder having a DP of 100-150 with an aqueous solution comprising sodium hydroxide, urea, zinc oxide, and water thereby forming a cellulose solution precursor, wherein the sodium hydroxide, the urea, and the zinc oxide have a concentration of 6-8% w/w, 12-14% w/w, and 0.1-0.2% w/w m/v in the in the water, respectively; adjusting the temperature of the cellulose solution precursor to between −20° C. to 0° C.; and adjusting the temperature of the cellulose solution precursor to 0° C. to 22° C. resulting in dissolution of substantially all of the cellulose and forming the crude cellulose dope; optionally filtering the crude cellulose dope with at least one filter having a pore size of 20-500 µm thereby forming a pre-filtered cellulose dope; filtering the crude cellulose dope or the pre-filtered cellulose dope with a filter having a pore size of 5 µm thereby forming a filtered cellulose dope; degassing the filtered cellulose dope under reduced pressure at a temperature between 0-20° C. thereby forming a cellulose dope; and extruding the cellulose dope in a coagulation bath thereby forming the regenerated cellulose composite fiber.

In certain embodiments, the aqueous solution further comprises FIR emissive nanoparticles selected from the group consisting of titanium oxide, zirconium dioxide, aluminum oxide, magnesium oxide, silicon dioxide, and mixtures thereof.

In a second aspect, provided herein is a regenerated cellulose composite fiber prepared according to the method of the first aspect, wherein the regenerated cellulose composite fiber optionally comprises FIR emissive nanoparticles.

It is an objective of the present disclosure to provide a method of preparing regenerated composite cellulose fibers for textile applications using, but not limited to, textile waste, such as cellulose powder, pre- or post-consumer textile waste, fiber from textile recycling process or other scraps from the manufacturing process. In instances in which recycled cellulose powder is used as a raw starting material in the methods described herein, it can be obtained from recycled blended textile via a hydrothermal treatment, such as the process described in PCT Patent Application No. PCT/CN2019/107499. Cellulose nanoparticles can be prepared from recycled or virgin cellulose powder. The cellulose nanoparticles can be used in the preparation of the spinning dope, which can then be used to spin the fiber.

In the present disclosure, direct dissolution of cellulose power in cold NaOH-based solvent can be used, eliminating high spinning temperature and the use of polluting chemicals and synthetic polymers in both solvents and raw material. Both IR emission and UV blocking performance of the regenerated cellulose fiber are evaluated.

BRIEF DESCRIPTION OF THE DRAWINGS

The above and other objects and features of the present disclosure will become apparent from the following description of the disclosure, when taken in conjunction with the accompanying drawings.

DETAILED DESCRIPTION

Figure 1:
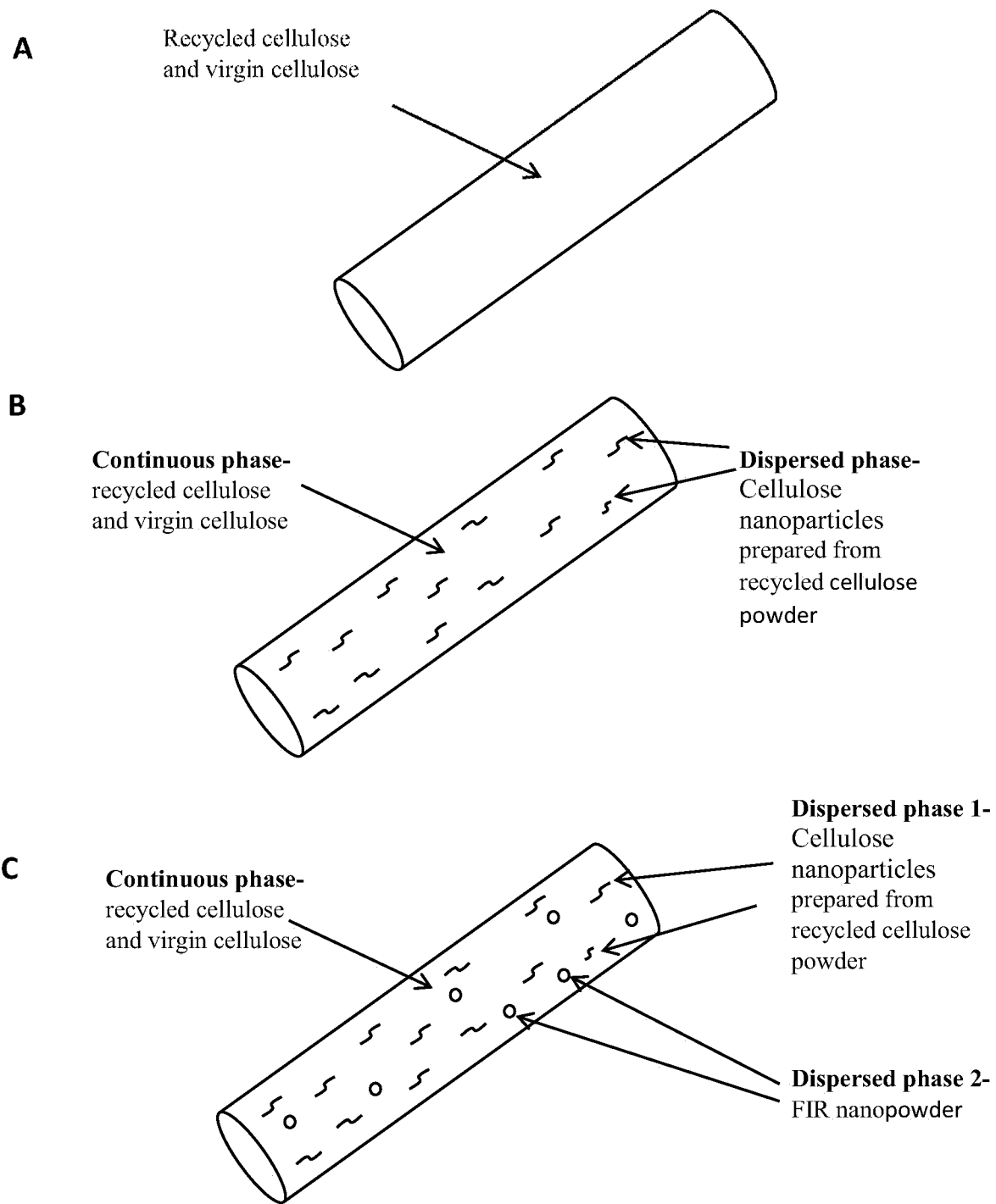
FIG. 1 depicts (A) a schematic showing the structure of a regenerated cellulose fiber; (B) a schematic showing the structure of a regenerated cellulose composite fiber; and (C) a schematic showing the structure of functional regenerated cellulose composite fiber.

The present disclosure provides methods of preparing a cellulose dope, a method of preparing a regenerated cellulose composite fiber from the cellulose dope, and products thereof. The regenerated cellulose composite fiber can optionally contain functional materials that impact improved physical, chemical, and/or optical properties to the regenerated cellulose composite fiber.

The present disclosure provides a method of preparing a cellulose dope, the method comprising: providing a cellulose solution comprising a metal hydroxide, urea, zinc oxide, cellulose, and water; filtering the cellulose solution through at least one filter thereby forming a filtered cellulose solution; combining the filtered cellulose solution with a dispersion comprising cellulose nanoparticles and water thereby forming a crude cellulose dope; filtering the crude cellulose dope through at least one filter thereby forming a filtered cellulose dope; degassing the filtered cellulose dope thereby forming the cellulose dope.

The metal hydroxide is not particularly limited. Any metal hydroxide that is at least partially soluble in the cellulose solution can be used in the methods described herein. In certain embodiments, the metal hydroxide is an alkaline earth metal hydroxide, an alkali metal hydroxide, or a mixture thereof. Exemplary metal hydroxides include, but are not limited to, LiOH, NaOH, KOH, RbOH, CsOH, $Mg(OH)_2$, $Ca(OH)_2$, or mixtures thereof. Alternatively, other strong bases can be used in place of the metal hydroxide, such as a metal alkoxide (e.g., an alkaline earth metal or an alkali metal $C_1$-$C_6$ alkoxide), metal oxides (e.g., an alkaline earth metal or an alkali metal oxide, such as $Li_2O$, $Na_2O$, $K_2O$, $Rb_2O$, $Cs_2O$, MgO, and CaO), and the like. In certain embodiments, the metal hydroxide is KOH.

The metal hydroxide can be present in the cellulose solution at a concentration between 5-10% w/w, 5-9% w/w, 6-9% w/w, or 6-8% w/w.

The urea can be present in the cellulose solution at a concentration between 7-15% w/w, 8-15% w/w, 9-15% w/w, 10-15% w/w, 11-15% w/w, 11-14% w/w, or 12-14% w/w.

The zinc oxide can be present in the cellulose solution at a concentration between 0.1-0.8% w/w, 0.1-0.6% w/w, 0.1-0.4% w/w, 0.1-0.3% w/w, 0.1-0.2% w/w, 0.1-0.15% w/w, or 0.11-0.13% w/w.

The concentration of the metal hydroxide, the urea, and the zinc oxide can be 5-10% w/w, 7-15% w/w, and 0.1-0.4% w/w in the in the cellulose solution, respectively. In certain embodiments, the concentration of the metal hydroxide, the urea, and the zinc oxide can be 6-9% m/v, 8-14% w/w, and 0.1-0.3% w/w; 6-8% w/w, 12-14% w/w, and 0.1-0.2% w/w; or 7% w/w, 13% w/w, 0.12% w/w in the cellulose solution, respectively.

Advantageously, the regenerated cellulose composite fiber prepared according to the methods described herein can be imparted with functional properties with the addition of materials having functional properties. For example, FIR emissive nanoparticles and/or UV blocking particles can be included in the cellulose solution to impart FIR emissive and/or UV blocking properties to the regenerated cellulose composite fiber. Accordingly, in certain embodiments, the cellulose solution further comprises at least one material having functional properties selected from the group consisting of FIR emissive nanoparticles and UV blocking particles. Exemplary FIR emissive nanoparticles include, but are not limited to titanium oxide, zirconium dioxide, aluminum oxide, magnesium oxide, silicon dioxide, and mixtures thereof.

Figure 2A:
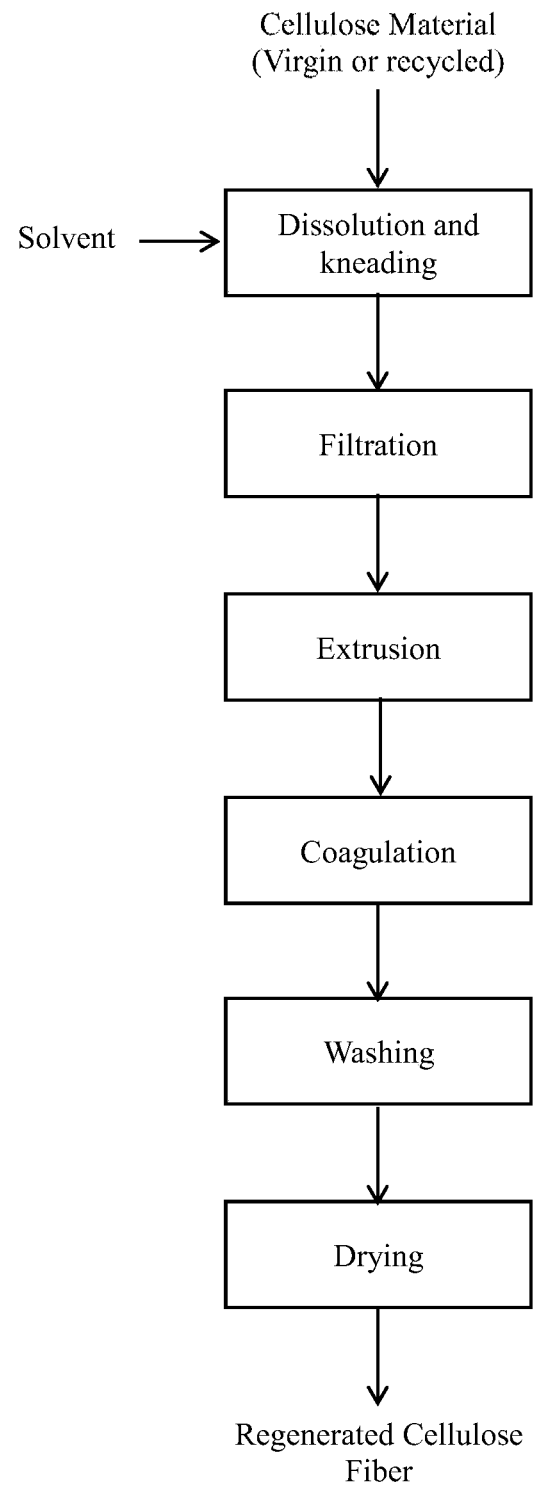
FIG. 2A depicts a flow diagram for the preparation of regenerated cellulose fiber.
Figure 2B:
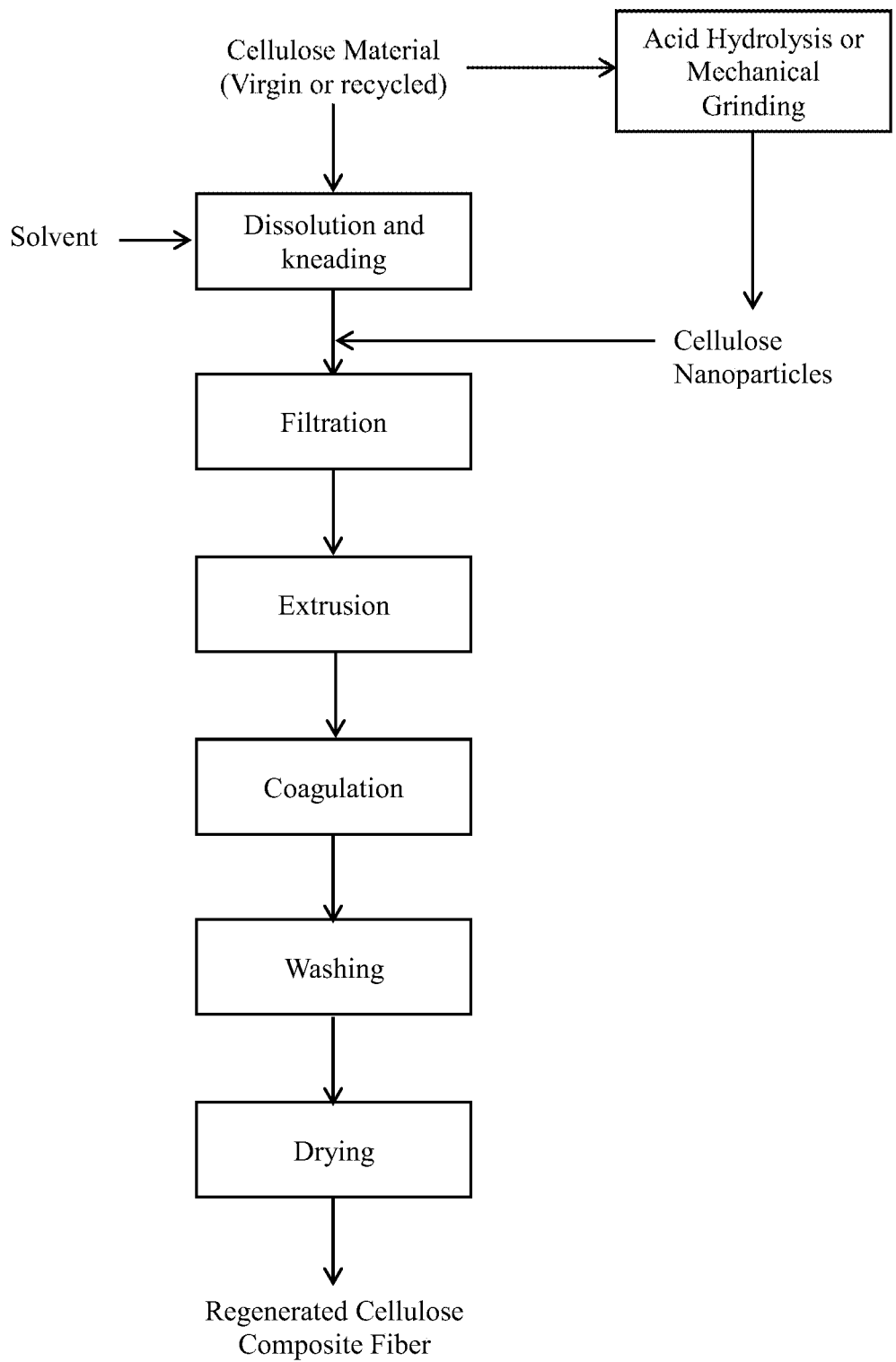
FIG. 2B depicts a flow diagram for the preparation of regenerated cellulose composite fiber.
Figure 2C:
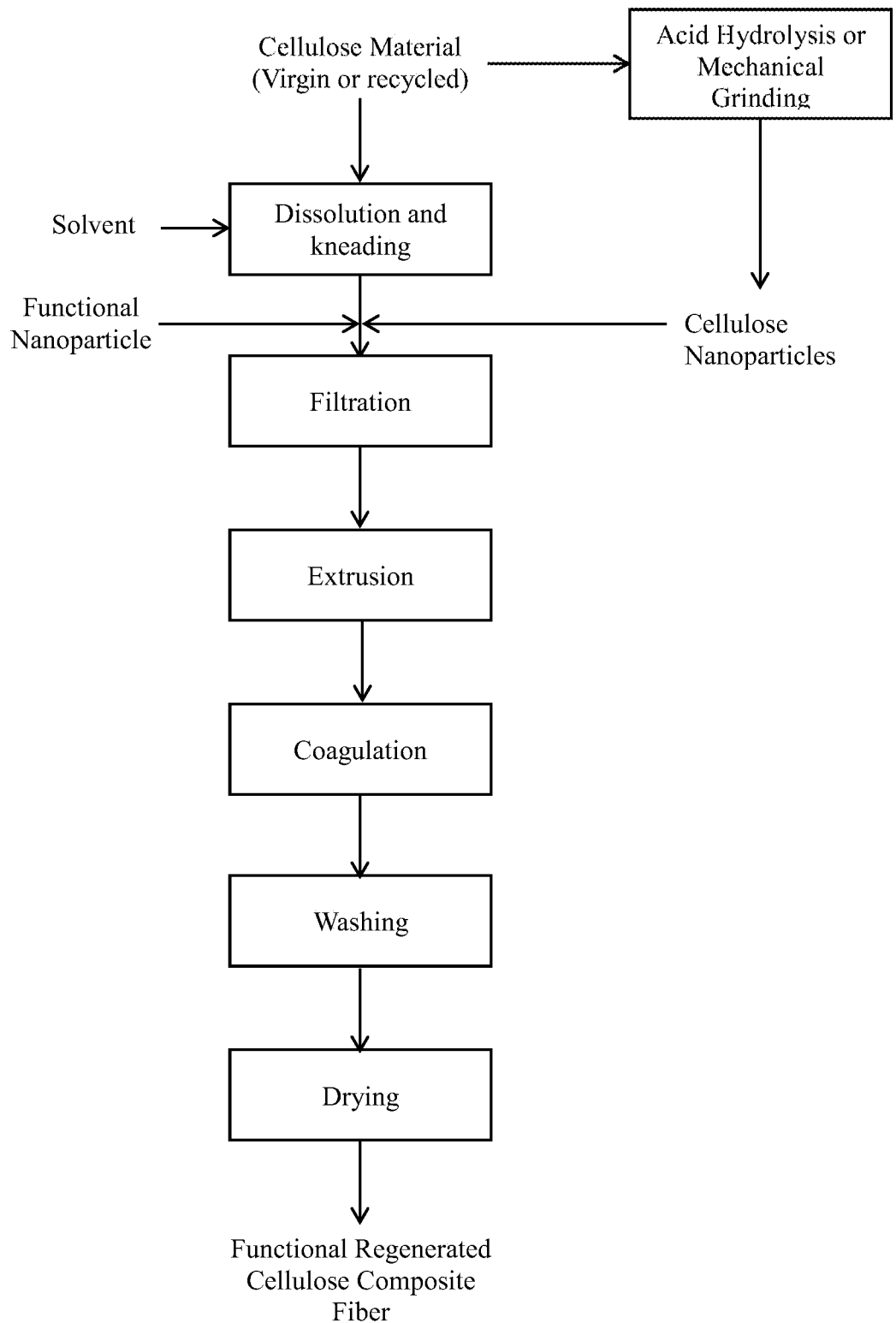
FIG. 2C depicts a flow diagram for the preparation of functional regenerated cellulose composite fiber.
Figure 3:
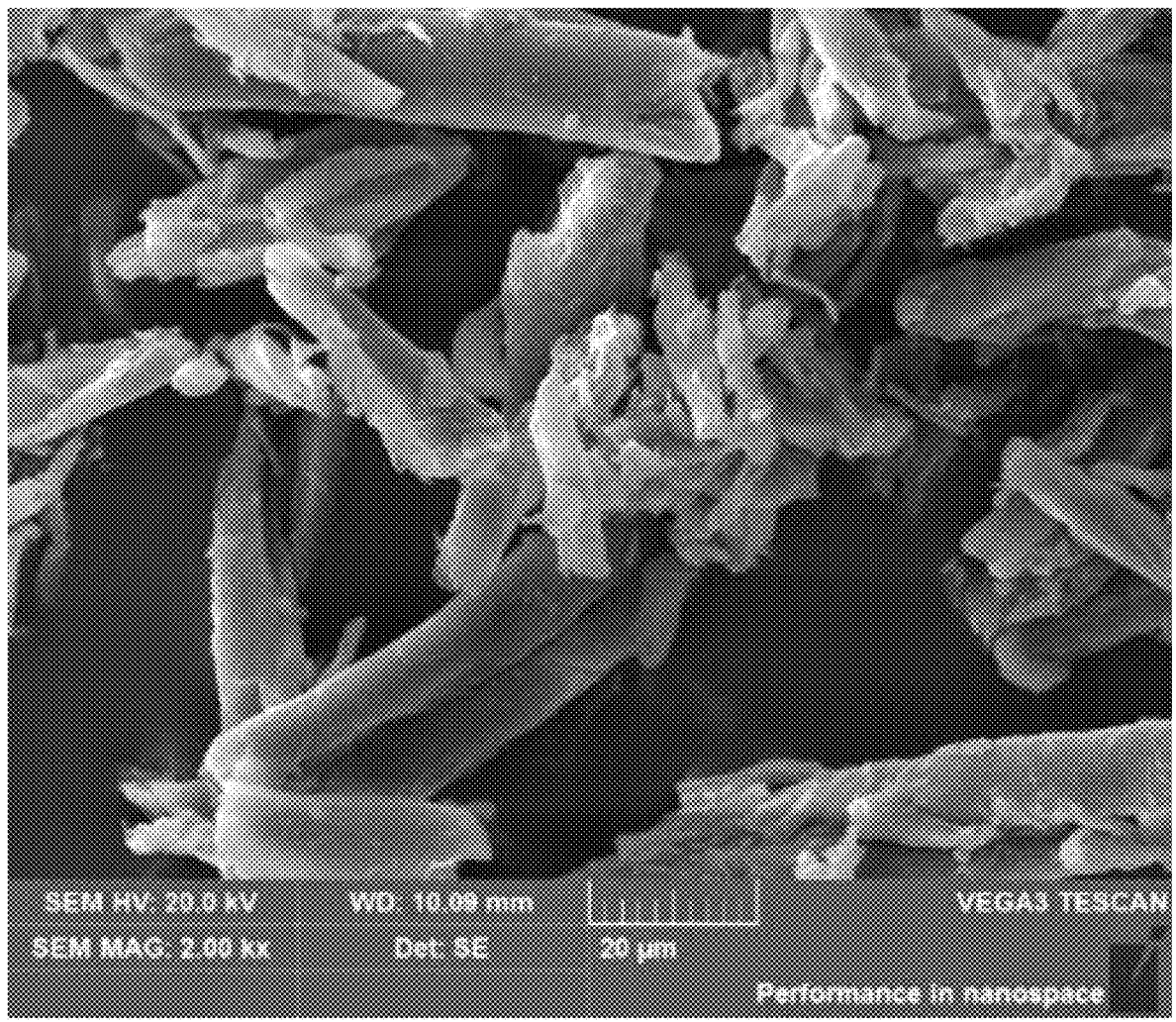
FIG. 3 depicts the SEM image of cellulose powder obtained from hydrothermal separation process.
Figure 4A:
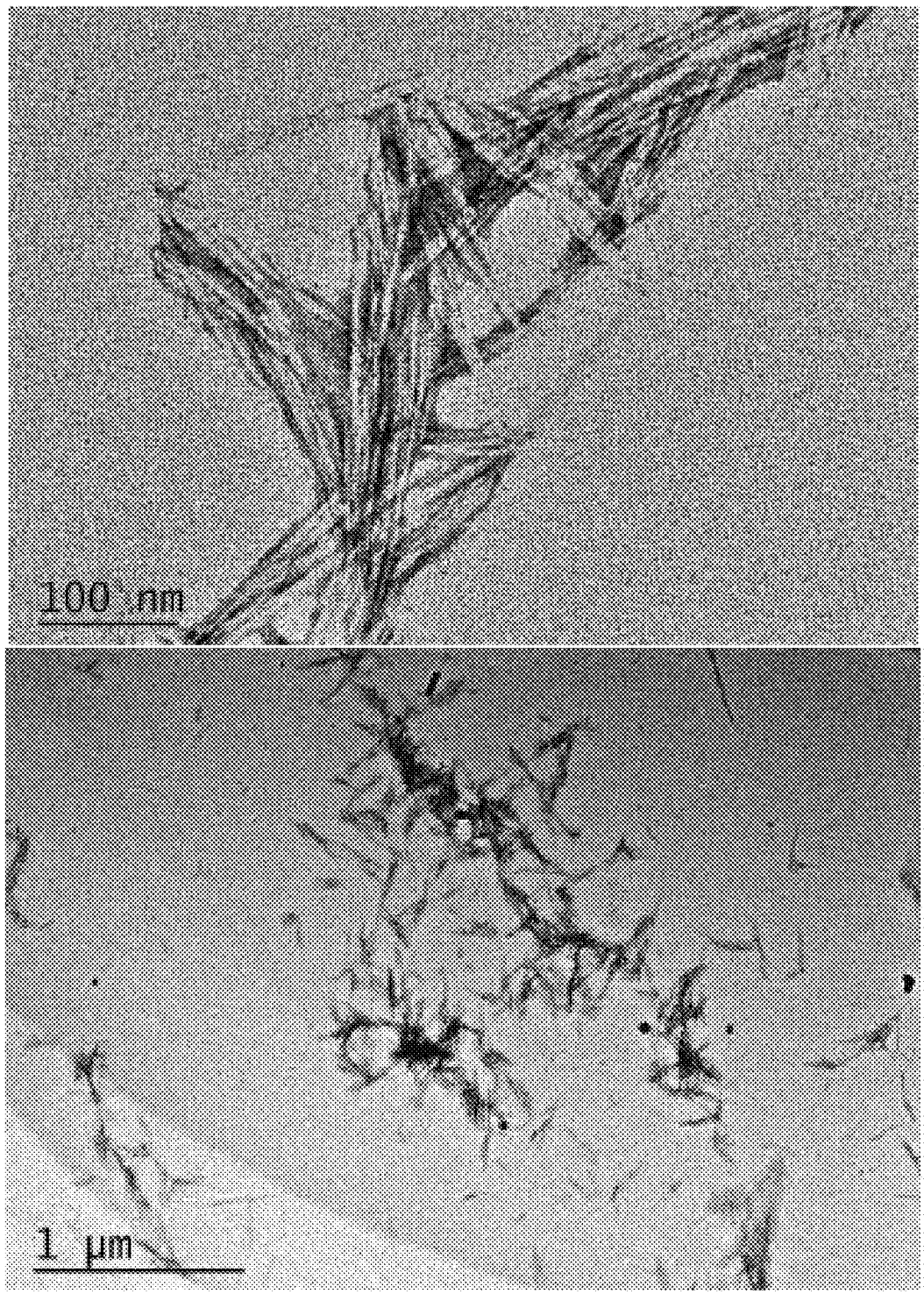
FIG. 4A depicts the TEM image of cellulose nanoparticles obtained from acid hydrolysis.
Figure 4B:
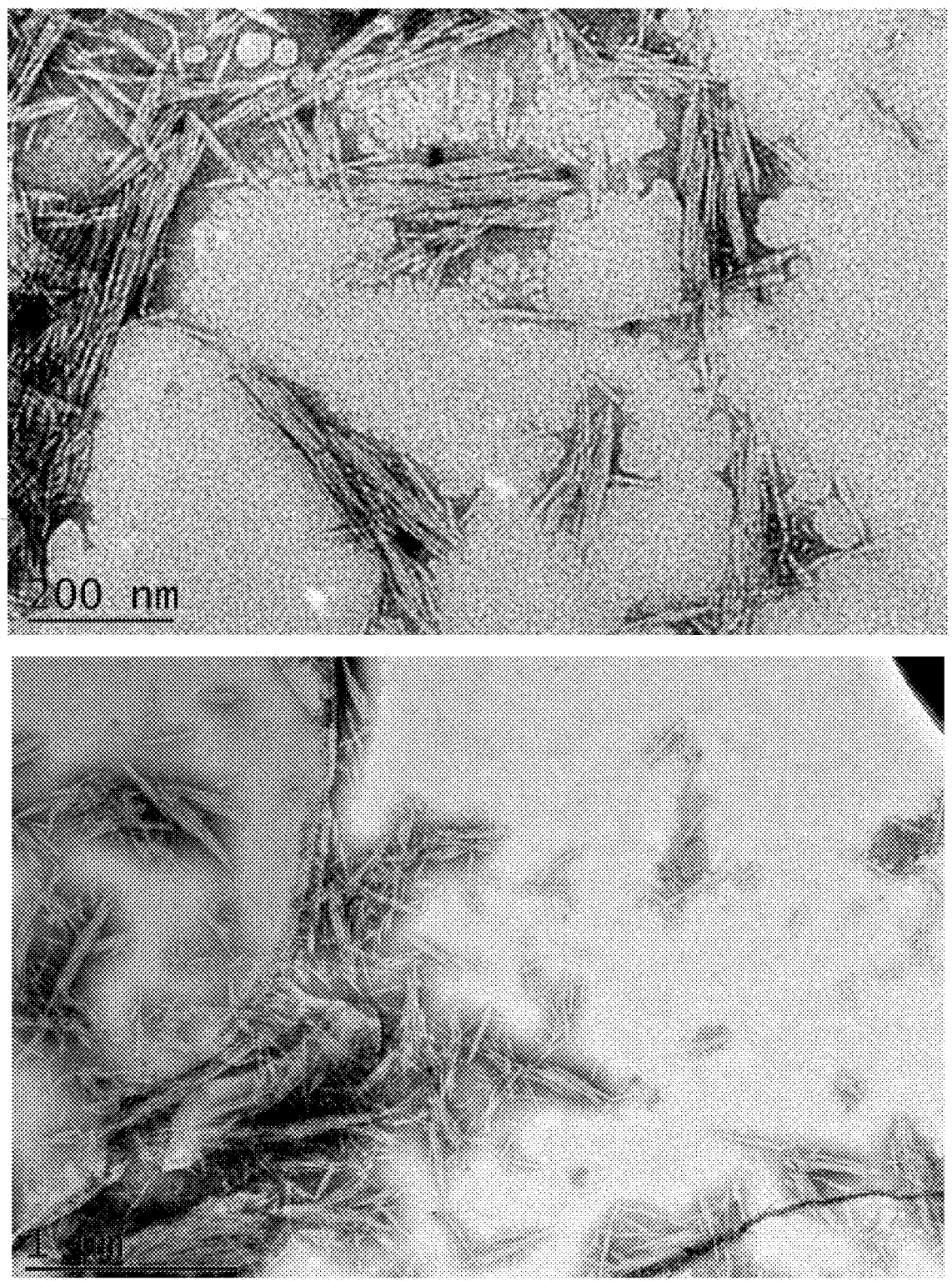
FIG. 4B depicts the TEM image of cellulose nanoparticles obtained from mechanical grinding using a disc grinder.
Figure 5A:
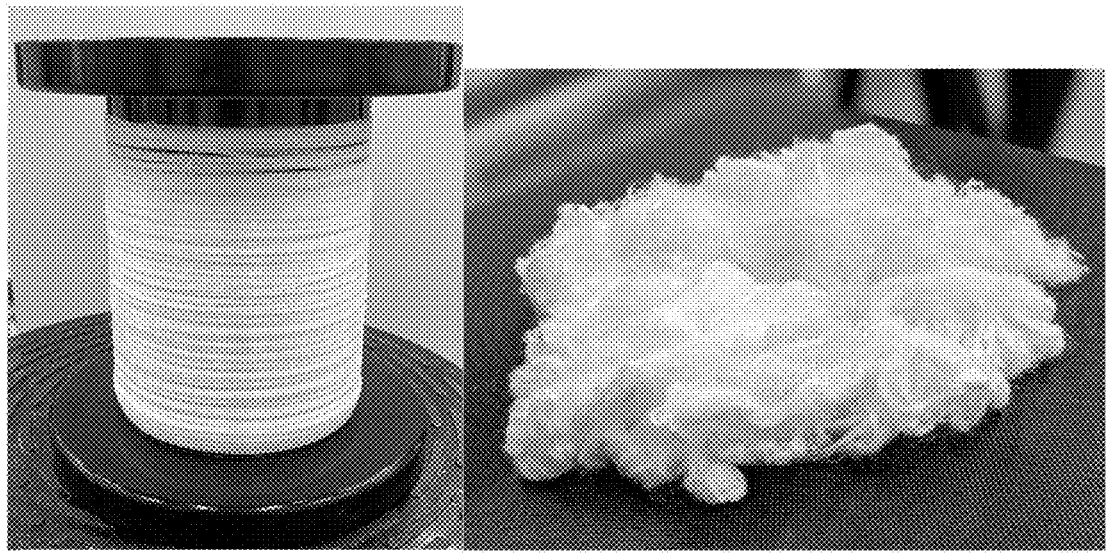
FIG. 5A depicts photos of the functional regenerated cellulose composite fiber prepared in Example 7.
Figure 5B:
FIG. 5B depicts a photo of the fabric knitted using the functional regenerated cellulose composite fiber prepared in Example 7.

FIR, especially in the wavelength range of 8~15 μm is studied extensively with proven benefits to human health. Examples of such benefits include increasing blood microcirculation and increase blood oxygen level. Blocking of UVA and UVB are highly desirable property for textile products as exposure to these UV radiations are known to associated with skin aging, burning and skin cancer. Exemplary flow diagrams of the methods described herein are presented in FIG. 2A-2C.

The cellulose can be cellulose particles, cellulose fiber, cellulose pulp, or a mixture thereof.

The cellulose and cellulose nanoparticles can be prepared from a large variety of cellulose polymer containing raw materials. In certain embodiments, the cellulose polymer may be synthetic or of any plant origin, and includes, for example, those fibrous materials derived from natural products containing celluloses, such as any one or a combination of wood, bamboo, cotton, banana, piria, hemp ramie, linen, coconut palm, soya, hoya, bagasse, kanaf, retting, mudrar, cotton, linen, and flax.

The cellulose polymer may take any physical form, including a cellulose powder or a textile. The textile may be in the form of a fabric, a fiber, a filament, a film, garment, chopped or flocculated fiber, and combinations thereof.

The cellulose and cellulose nanoparticles can be prepared from virgin cellulose, a recycled cellulose, e.g., from post-consumer textile waste, or mixtures thereof. The cellulose can be in the form of a powder. The cellulose powder can have a particle size below 500 μm. In certain embodiments, the cellulose powder has a particle size of 1 to 500 μm; 50 to 500 μm; 50 to 400 μm; 50 to 300 μm; 50 to 300 μm; 100 to 300 μm; or 100 to 200 μm.

The cellulose and cellulose nanoparticles used in connection with the methods described herein can be purchased from commercial sources or prepared according to any method known in the art. In certain embodiments, the cellulose and cellulose nanoparticles are prepared using a hydrolysis method. The hydrolysis method may be acid hydrolysis, alkaline oxidative decomposition, hydrothermal treatment, steam explosion, or the like, or a combination of two kinds of such methods. The cellulose and cellulose nanoparticles can be obtained by hydrothermal treatment of a cellulosic textile comprising a cellulose polymer, such as cotton (e.g., see methods described in PCT Patent Application No. PCT/CN2019/107499, hereby incorporated by reference).

The cellulose and cellulose nanoparticles may be prepared, for example, by an organic acid catalyzed hydrothermal treatment of a post-consumer textile comprising a natural, semi-synthetic, and/or synthetic cellulosic material or a natural cellulosic material, which produces a cellulose powder. The cellulose powder can be used directly in the methods described herein or its particle size can be reduced by mechanical and/or chemical means prior to use.

In certain embodiments, the cellulose and/or cellulose nanoparticles are prepared by subjecting a post-consumer textile to an acid catalyzed hydrothermal treatment, the method comprising the step of bringing into contact the post-consumer textile, an aqueous solution, and an acid and heating the resulting mixture.

Hydrothermal treatment involves the chemistry of hot water under pressure to carry out chemical reactions. These reactions are usually conducted at temperatures ranging from 60 to 350° C. and pressures in the range from 0.1 to 15 MPa. In certain embodiments, the hydrothermal treatment is conducted at 120-150° C., 125-145° C., 130-140° C., or 132-138° C. In certain embodiments, the hydrothermal treatment is conducted at 0.1 to 0.5, 0.2 to 0.5, 0.2 to 0.4, or 0.25 to 0.35 MPa. The reaction medium may be water alone or in combination with inorganic and/or organic acids.

The organic acid can be methanesulfonic acid, oxalic acid, tartaric acid, citric acid, malic acid, formic acid, acetic acid, or a combination thereof. In certain embodiments, the hydrothermal treatment aqueous solution contains the organic acid catalyst in an amount of 0.1% to 30% or 0.5% to 10% w/w. The addition of a larger amount of acid can accelerate the rate of the hydrothermal treatment reaction can shorten the time required for completion and/or assist with decomposition of thicker and/or denser post-consumer textiles.

The post-consumer textile may comprise cotton or polyester and cotton, such as PET and cotton. In instances in which the post-consumer textile contains polyester, it may contain any proportion of polyester content, for example from 1-99% w/w.

The post-consumer textile can optionally be divided, e.g., by cutting, tearing, and/or shredding, into smaller pieces prior to the preparation of the cellulose powder. This optional step can improve the yield of cellulose powder and reduce treatment time by increasing the surface area of the treated post-consumer textile.

In certain embodiments, the ratio of solids (i.e., the post-consumer textile) to liquid is 1:30-200 or 1:50-150 by weight. Lower ratios of solid to liquid tend to accelerate the rate of the hydrothermal treatment reaction.

In certain embodiments, hydrothermal treatment comprises heating the mixture at a temperature between 110-180° C. In certain embodiments, hydrothermal treatment comprises heating the mixture at a temperature between 120-150° C. The temperature of the hydrothermal treatment can be increased at a rate of 4-6° C./minute from room temperature to the desired temperature (e.g., 110-180° C. or 120-150° C.).

In certain embodiments, the hydrothermal treatment is conducted at a pressure of 0.1 to 10 MPa or 0.1 to 1 MPa. In certain embodiments, hydrothermal treatment is conducted under autogenic pressure, i.e., pressure generated as a result of heating in a closed system. Alternatively or additionally, the pressure can be applied externally, e.g., by mechanical means.

In certain embodiments, the hydrothermal treatment is conducted in a closed high-pressure reactor, and the temperature is raised to 110-180° C. at a heating rate of 4-6° C./min and then maintained under stirring. During the hydrothermal treatment, the autogenous pressure in the closed higher-pressure reactor can be in the range of 0.10-1 MPa. The hydrothermal treatment can be completed in 0.5-3 h.

During hydrothermal treatment, subcritical conditions can be achieved in which the cotton fiber can undergo an acid catalyzed hydrolytic degradation reaction thereby producing cellulose powder.

Cellulose powder prepared using the hydrothermal treatment process described herein can have a low DP of about 100-150 and requires the addition of high DP (300-700) cellulose to be in the suitable processing range for respinning into textile fibers with comparable tenacity to commercial products, such as viscose fiber and lyocell fiber. High DP cellulose can be virgin or recycled. If recycled, it can be obtained from pre- or post-consumer textile waste or in-process textile scrap.

The cellulose solution can be prepared by combining cellulose with an aqueous solution comprising the metal hydroxide, urea, zinc oxide, and water. The order of addition is not particularly limited and all order of additions are contemplated by the present disclosure. In certain embodiments, the metal hydroxide, urea, and zinc oxide are first combined with water and the cellulose is then added. The cellulose can be added once the metal hydroxide, urea, and zinc oxide have substantially dissolved in the water.

The components of the cellulose solution can be combined at room temperature and cooled to −18° C. to 0° C. Alternatively, the components of the cellulose solution can be combined at a temperature between −18° C. to 0° C., which can be accomplished by adding cellulose to an aqueous solution comprising the metal hydroxide, urea, zinc oxide, and water, which has been cooled to −18° C. to 0° C. prior to addition thereby forming a cellulose solution precursor. Once the components of the cellulose solution precursor have been combined and the temperature of the cellulose solution precursor is between −18° C. to 0° C., the cellulose solution precursor can be adjusted to 0° C. to 22° C., which can result in substantially the dissolution of all of the cellulose and thereby forming the cellulose solution. In certain embodiments, the step of adjusting the temperature of the cellulose solution precursor to 0° C. to 22° C. optionally comprises stirring the cellulose solution precursor to aid in the dissolution of all materials. The cellulose solution precursor can be stirred from 30 minutes to 6 hours.

The resulting cellulose solution can then be filtered using at least one filter thereby forming the filtered cellulose solution. In certain embodiments, the cellulose solution is filtered using one or more filters having a pore size between 5-500 μm. Filtration of the cellulose solution can be improved by sequentially filtering the cellulose solution through progressively finer filters. This reduces the likelihood that the filter becomes blocked by particles and/or agglomerates larger than the pore size of the filter. Thus, in certain embodiments, the cellulose solution is filtered through 1, 2, 3, 4, 5, 6 or more filters having a pore size between 5-500 μm. The cellulose solution is filtered through 1, 2, 3, 4, 5, 6 or more filters having a pore size between 5-20, 50-100, 100-300, and 300-500 μm. In certain embodiments, the cellulose solution is filtered through 6 filters having a pore size of 500, 300, 100, 50 and 20 and 5 μm, which results in a solution comprising particles having at least one dimension less than 5 μm.

The filtered cellulose solution can then be degassed under reduced pressure at a temperature between 0-20° C. Degassing can occur at a pressure of about 20-100 mbar. Degassing is conducted until substantially all gas is removed from the filtered cellulose solution or until no additional gas is removed. Degassing is typically conducted for 1-5 hours.

The incorporation of cellulose nanoparticles in the regenerated cellulose composite advantageously enhances the mechanical properties, such as tenacity, of the thus formed fibers prepared using the regenerated cellulose composite. The cellulose nanoparticles can have an average particle size of 50-500 nm, 100-500 nm, 100-400 nm, 200-400 nm, or 250-300 nm.

Cellulose nanoparticles having a particle size of 50 to 500 nm are available commercially or can be prepared from cellulose particles having a particle size larger than 100 nm. Since the cellulose powder prepared from hydrothermal treatment typically produces cellulose powder with average particles sizes in the range of 100-500 nm, the average particle size of the cellulose powder can be reduced to 50-500 nm using any method known to those of skill in the art.

There are various known methods for reducing the particle size of substances, including reduction by comminution or de-agglomeration by milling and/or sieving. Exemplary methods for cellulose powder particle reduction include, but are not limited to jet milling, hammer milling, compression milling, tumble milling processes (e.g., ball milling), mechanical grinding (e.g., disc grinding), and acid hydrolysis. Particle size control parameters for these processes are well understood by the person skilled in the art. For example the cellulose powder particle size reduction achieved in a jet milling process is controlled by adjusting a number of parameters, the primary ones being mill pressure and feed rate. In a hammer mill process, the particle size reduction is controlled by the feed rate, the hammer speed and the size of the opening in the grate/screen at the outlet. In a compression mill process, the particle size reduction is controlled by the feed rate and amount of compression imparted to the material (e.g. the amount of force applied to compression rollers). In a disc grinding process, the particle size reduction is controlled by distance between the two discs and the number of grinding cycles.

The size of the obtained cellulose powder from the hydrothermal treatment method can be about 100-200 μm with DP in the range of 100-150. The recycled cellulose powder obtained from hydrothermal treatment can be converted to cellulose nanoparticles by acid hydrolysis or by mechanical grinding. By further acid hydrolysis of the obtained cellulose powder from the hydrothermal treatment, cleavage on the glycosidic bonds of cellulose in the disordered regions of microfibrils is expected to occur, resulting in cellulose nanoparticles. The cellulose nanoparticles can also be obtained by mechanical grinding using disc grinder and planetary ball mill. Mechanical grinding that is expected to promote breaking up the cell wall matrix and liberate the cellulose nanoparticles having a higher degree of microfibril structure. To avoid agglomeration, cellulose nanoparticles should be kept as a suspension in water and should never be dried.

The dispersion can comprise the cellulose nanoparticles at a concentration of 5-15 w/w %. The pH of the dispersion can be range between 11-13.

The dispersion can be prepared by combining the cellulose nanoparticles and water. The concentration of the dispersion can be between 1-10% w/w, 1-9 w/w, 1-8% w/w, 1-7% w/w, 2-7% w/w, 3-7% w/w, 4-7% w/w, or 4-6% w/w of the cellulose nanoparticles in water.

The thus prepared dispersion can then be combined with the cellulose solution thereby forming the crude cellulose dope. The step of combining the dispersion and the cellulose solution can optionally comprise the step of mixing the dispersion and cellulose solution. Mixing can be performed in any way known to the person skilled in the art. Commonly used mixing devices are a tumbler mixer, a high-speed mixer; blenders, for example V blender, ribbon blender or a cone blender; mixers, for example a jet mixer, a planetary kneader, or a Banbury mixer.

The crude cellulose dope can then be filtered using at least one filter. In certain embodiments, the crude cellulose dope is filtered using one or more filters having a pore size between 5-500 µm. Filtration of the crude cellulose dope can be improved by sequentially filtering the crude cellulose dope through progressively finer filters. This reduces the likelihood that the filter becomes blocked by particles and/or agglomerates larger than the pore size of the filter. Thus, in certain embodiments, the crude cellulose dope is filtered through 1, 2, 3, 4, 5, 6 or more filters having a pore size between 5-500 µm. The crude cellulose dope is filtered through 1, 2, 3, 4, 5, 6 or more filters having a pore size between 5-20, 50-100, 100-300, and 300-500 µm. In certain embodiments, the crude cellulose dope is filtered through 6 filters having a pore size of 500, 300, 100, 50 and 20 and 5 µm, which results in dispersion particles having at least one dimension less than 5 µm.

The filtered cellulose dope can then be degassed under reduced pressure at a temperature between 0-20° C. Degassing can occur at a pressure of about 20-100 mbar. Degassing is conducted until substantially all gas is removed from the filtered cellulose dope or until no additional gas is removed. Degassing is typically conducted for 1-5 hours.

Commercial grade regenerated cellulose fiber is typically less than 50 µm in diameter. The preparation of a high-quality cellulose dope for spinning, which is free from gas bubbles and solid particles greater than 5 µm and bubbles is essential for the fiber spinning process. The presence of impurities or bubbles may cause blockage of filters and holes of the spinneret. In the case of the composite fiber, dispersion of the nanoparticles into the viscous cellulose solution to prepare composite fiber and is the key step in the present disclosure. Both cellulose nanoparticles and the functional nanoparticles can be dispersed by high-speed homogenizer or planetary ball mill before mixing with the cellulose solution. Continuous phase of the spinning dope comprised of dissolved cellulose from different sources, ideally as much recycled material as possible, in a NaOH based aqueous solution. Both dissolution and mixing of the solid phase of cellulose nanoparticles and functional nanoparticle can be performed in a double planetary kneader. Multiple filtration with metal mesh to remove impurities or insoluble. Finally, degassing by vacuum is performed before loading into the extruder.

The prepared cellulose dope is loaded into an extruder with temperature control of the dope throughout the spinning process. Extrusion rate of the dope through a spinneret can be controlled by a gear pump. The spinneret can be configured horizontally and submersed under the coagulation bath. Weak organic acids at 10-20° C., such as citric acid, phytic acid, and acetic acid, are used as the coagulating agent. Optionally, a second coagulation bath of the same composition is used, followed by washing baths with water at 20-60° C. Multiple drawing of the fiber was performed with overall draw ratio of 1-5. Fiber is dried at multiple stage with drying temperature set at 50-100° C. Finally, the fiber is collected on a robbin.

EXAMPLES

Example 1—Preparation of Cellulose Powder from Textiles 15 g of white shirt textile waste with a ratio of polyester/cotton ratio of 65/35 was placed in 1.8 L of 5% w/w citric acid aqueous solution in an autoclave reaction vessel. Under high pressure, the autoclave was heated at a rate of 5° C./min. The degradation reaction of cotton fibers was carried out at 130° C. for 1.5 h.

After the reaction was completed, the heat was turned off, and after the autoclave reaction vessel was cooled to room temperature, the autoclave reaction vessel was opened, and the reaction product was taken out.

The reaction product was filtered through a sieve to obtain polyester fiber, and the remaining mixture is vacuum filtered through a filtration membrane to obtain cotton fiber fragments, which are then separately washed and dried in a forced air oven to a constant weight to obtain a polyester. The recovery of the fiber aggregate was 98%, and the recovery rate of the cellulose material was 83%.

Example 2—Preparation of Cellulose Powder from Textiles 17 g of sheets of textile waste with a polyester/cotton ratio of 20/80 were placed in 1.5 L of an aqueous solution containing 1 w/w % methanesulfonic acid in an autoclave reaction vessel, and the autoclave reaction vessel was heated to 140° C. at a heating rate of 6° C./min for 1 h.

After the reaction was completed, the heat was turned off, and after the autoclave reaction vessel cooled to room temperature, the reaction vessel was opened, and the reaction product was taken out.

The reaction product is filtered through a sieve to obtain polyester fiber, and the remaining mixture is vacuum filtered through a filtration membrane to obtain cotton fiber fragments, which are respectively washed and dried in a forced air oven to a constant weight to obtain a polyester fiber. The recovery of the aggregate was 99%, and the recovery of cellulose material was 81%.

Example 3 (Preparation of Cellulose Nanoparticle by Acid Hydrolysis)

Recycled cellulose micropowder was obtained from the hydrothermal process. 50 g of hydrothermal cellulose micropowder is dispersed into 1 L of 65 v/v % sulfuric acid (at a solid content of 5 w/v %). The suspension was kept at 40°

C. under vigorous stirring for 60 minutes. The reaction was then quenched with water. The quenched reaction mixture was then washed with additional portions of water and then centrifuged. This process was repeated 3 times or until the pH of the solution was 7.

Example 4 (Preparation of Cellulose Nanoparticle by Mechanical Grinding by Ultrafine Grinder)

Recycled cellulose powder was obtained from the hydrothermal process. 50 g of hydrothermal cellulose micropowder is dispersed into 1 L of water (at a solid content of 5 w/v %) to form a slurry. The grinding condition was controlled by setting the grinder disc gap at −80 (A zero setting indicates the two discs are barely touching each other, whereas positive values indicate the gap distance in between the two discs, and a negative setting indicates the discs are tightly pressing onto each other). The cellulose slurry was loaded into the disc grinder for 40 cycles of grinding. The thus prepared cellulose nanoparticles are generally rod shaped and have an average length of about 120 nm and average diameter of about 20 nm, which form aggregates in water having a volume equivalent diameter (dv) of about 1 µm.

Example 5 (Regenerated Cellulose Fiber)

1000 g of solvent was first prepared at room temperature by mixing NaOH, urea, ZnO, $H_2O$ at a mass ratio of 6:11:0.1:82.9 until all solids were dissolved. The solvent was cooled to −18° C. before gradual addition of cellulose material. 5 g of hydrothermal cellulose micropowder (100-200 µm average diameter, DP-120) and 45 g of recycled cellulose fiber (DP-480) are added into 950 g of the pre-cooled solvent to form a total of 5 w/w % cellulose solution. The mixture was stirred at 40 RPM for 1 h before increasing temperature to 0° C. and was kept under this condition for 8 hours without stirring. The dope was then thawed from 0° C. to 20° C. with constant stirring (40 RPM) for 1 hour until complete dissolution of the cellulose material (confirmed by the observation of a complete transparent dope under microscope). The dope was then ready to be combined with cellulose nanoparticle suspension and optionally FIR emissive nanoparticle suspension to form regenerated cellulose composite fiber (Example 6) or functional regenerated cellulose composite fiber (Example 7). Filtration of the final dope was then performed using metal mesh with pore size of 500, 300, 100, 50 and 20 and 5 Degassing of the dope was performed under vacuum at 20° C., 30 mbar for 3 hours. After the dope was degassed it was ready to be extruded directly to form regenerated cellulose fiber or regenerated cellulose composite fiber (Example 6) or functional regenerated cellulose composite fiber (Example 7).

Dope temperature was kept at 20° C. during extrusion. Citric acid (15 w/v %) at 20° C. was employed as the coagulation bath. Water at 50° C. was used as the washing bath. Draw ratio, which is the linear speed of the winder relative to the extrusion linear speed was kept at 2.0.

Example 6 (Regenerated Cellulose Composite Fiber)

Preparation steps for the cellulose solution (continuous phase) was done as in Example 5. Concentration and pH of cellulose nanoparticles obtained from Example 3 and is further adjusted to 5 w/w % and 12, respectively using 14.5 M NaOH, followed by dispersion using a high-speed homogenizer. 10 g of the 5 w/w % cellulose nanoparticles suspension was added into the 1 kg of 5 w/w % cellulose solution prepared in Example 5 in order to keep the absolute mass of cellulose nanoparticles (disperse phase) to cellulose (continuous phase) at 1:100. The cellulose solution and the cellulose nanoparticle suspension were thoroughly mixed in the planetary kneader for 1 hour. Finally, filtration, degassing, and fiber extrusion were there performed as in Example 5.

Example 7 (Functional Regenerated Cellulose Composite Fiber)

Preparation steps for the cellulose solution (continuous phase) was done as in Example 5. Concentration and pH of cellulose nanoparticles obtained from Example 3 and is further adjusted to 5 w/w % and 12 respectively using 14.5M NaOH, followed by dispersion using a high-speed homogenizer. To prepare the FIR suspension, 1 g of FIR nanopowder is added into 20 g of water and pH adjusted to 12 before dispersing by a high-speed homogenizer. 10 g of 5 w/v % cellulose nanoparticles suspension and 10 g of 5 w/v % dual FIR emission/UV blocking nanoparticles (44.3% $TiO_2$, 50.4% $ZrO_2$, 1.3% $Al_2O_3$, 1.6% MgO, 1.3% ZnO and 0.9% $SiO_2$ by mass. Average particle size: about 200 nm. Far IR emissivity: 90%) were then added into the 1 kg of 5 w/w % cellulose solution prepared in Example 5 in order to keep the absolute mass of both cellulose nanoparticles (disperse phase) and FIR nanoparticle (disperse phase) to cellulose (continuous phase) at 1:1:100. The cellulose solution, the cellulose nanoparticle suspension and the FIR nanoparticle suspension were thoroughly mixed in the planetary kneader for 1 hour. Finally, filtration, degassing, and fiber extrusion were there performed as in Example 5.

FIR emissivity of the obtained fiber was were evaluated according to GB/T 30127-2013. For the evaluation of UV blocking properties according to AATCC 183-2014, the obtained fiber was spun into yarn, then knitted to fabric.

RESULTS

| | | Continuous Phase | | Dispersed Phase | | Fiber Properties | | | |
|---|---|---|---|---|---|---|---|---|---|
| | | Total | | | | | | | |
| | | | Dissolved | Cellulose | FIR | | | | |
| | Raw Material | Averaged DP | Cellulose (w/w %) | Nanoparticle (w/w %) | Nanopowder (w/w %) | Tenacity, dry (cN/dtex) | Elongation (%) | FIR Emissivity | UPF Rating |
| Example 5 | Recycled cellulose fiber and powder (9:1) | 444 | 5 | 0 | 0 | 1.3 | 12.3 | 0.80 | 10 |

-continued

| | Raw Material | Averaged DP | Continuous Phase Total Dissolved Cellulose (w/w %) | Dispersed Phase Cellulose Nanoparticle (w/w %) | FIR Nanopowder (w/w %) | Fiber Properties Tenacity, dry (cN/dtex) | Elongation (%) | FIR Emissivity | UPF Rating |
|---|---|---|---|---|---|---|---|---|---|
| Example 6 | Recycled cellulose fiber and powder (9:1) | 444 | 5 | 0.05 | 0 | 2.0 | 9.5 | 0.80 | 10 |
| Example 7 | Recycled cellulose fiber and powder (9:1) | 444 | 5 | 0.05 | 0.05 | 1.6 | 14.2 | 0.85 | 40 |

What is claimed is:

1. A method of preparing a regenerated cellulose composite fiber, the method comprising:
providing a cellulose solution consisting of a metal hydroxide, urea, zinc oxide, cellulose having an average degree of polymerization (DP) of 300-800, and water, wherein the metal hydroxide urea, and zinc oxide are preset in cellulose solution at a concentration of 6-8% w/w, 12-14% w/w, and 0.11-0.13% w/w, respectively;
filtering the cellulose solution through at least one filter thereby forming a filtered cellulose solution;
combining the filtered cellulose solution with a dispersion comprising cellulose nanoparticles and water thereby forming a crude cellulose dope;
filtering the crude cellulose dope through at least one filter thereby forming a filtered cellulose dope;
degassing the filtered cellulose dope thereby forming a cellulose dope; and
extruding the cellulose dope in a coagulation bath thereby forming the regenerated cellulose composite fiber.

2. The method of claim 1, wherein the method further comprises combining cellulose with an aqueous solution comprising metal hydroxide, urea, zinc oxide and water, thereby forming a cellulose solution precursor; adjusting the temperature of the cellulose solution precursor to between −20° C. to 0° C.; and adjusting the temperature of the cellulose solution precursor to 0° C. to 22° C. resulting in dissolution of substantially all of the cellulose and forming the cellulose solution.

3. The method of claim 1, wherein the step of filtering the cellulose solution comprises filtering the cellulose solution with at least one filter having a pore size of at least 5 μm.

4. The method of claim 1, wherein the cellulose nanoparticles have an average diameter of 100-500 nm.

5. The method of claim 1, wherein the cellulose comprises virgin or recycled cellulose having a DP of 400-800 and cellulose powder having a DP of 100-150.

6. The method of claim 5, wherein the cellulose powder is produced by hydrothermal treatment of a cellulose powder precursor selected from the group consisting of textile waste, a virgin textile, raw cellulose material, and mixtures thereof.

7. The method of claim 6, wherein the hydrothermal treatment comprises heating the cellulose powder precursor at a temperature between 110-150° C. under autogenic pressure in the presence of an acid.

8. The method of claim 1, wherein the cellulose has an average DP of 400-500.

9. The method of claim 1, wherein the metal hydroxide is an alkaline earth metal hydroxide, an alkali metal hydroxide, or a mixture thereof.

10. The method of claim 1, wherein the metal hydroxide is sodium hydroxide.

11. The method of claim 1, wherein the dispersion comprises the cellulose nanoparticles at a concentration of 5-15% w/w.

12. The method of claim 11, wherein the dispersion has a pH of 11-13.

13. The method of claim 1, wherein the method further comprises providing cellulose powder having an average particle size between 50 to 100 μm and reducing the average particle size of the cellulose powder by acid hydrolysis or mechanical grinding thereby forming the cellulose nanoparticles, wherein the cellulose nanoparticles have an average diameter of 100-500 nm.

14. The method of claim 1, wherein the method comprises:
combining cellulose having an average DP of 400-500, wherein the cellulose consists of virgin or recycled cellulose having a DP of 450-550 and cellulose powder having a DP of 100-150 with an aqueous solution consisting of sodium hydroxide, urea, zinc oxide, and water thereby forming a cellulose solution precursor, wherein the sodium hydroxide, the urea, and the zinc oxide have a concentration of 6-8% w/w, 12-14% w/w, and 0.11-0.13% w/w in the cellulose solution, respectively; adjusting the temperature of the cellulose solution precursor to between −20° C. to 0° C.; and adjusting the temperature of the cellulose solution precursor to 0° C. to 22° C. resulting in dissolution of substantially all of the cellulose and forming the crude cellulose dope;
optionally filtering the crude cellulose dope with at least one filter having a pore size of 20-500 μm thereby forming a pre-filtered cellulose dope; filtering the crude cellulose dope or the pre-filtered cellulose dope with a filter having a pore size of 5 μm thereby forming a filtered cellulose dope;
degassing the filtered cellulose dope under reduced pressure at a temperature between 0-20° C. thereby forming a cellulose dope; and extruding the cellulose dope in a coagulation bath thereby forming the regenerated cellulose composite fiber.

\* \* \* \* \*